April 21, 1925.

G. A. MITCHELL 1,534,407

TRIPOD HEAD

Filed Feb. 23, 1921

Inventor
George A. Mitchell
By
his Attorney

Patented Apr. 21, 1925.

1,534,407

UNITED STATES PATENT OFFICE.

GEORGE A. MITCHELL, OF LOS ANGELES, CALIFORNIA, ASSIGNOR TO MITCHELL CAMERA CO., OF LOS ANGELES, CALIFORNIA, A CORPORATION OF CALIFORNIA.

TRIPOD HEAD.

Application filed February 23, 1921. Serial No. 447,287.

*To all whom it may concern:*

Be it known that I, GEORGE A. MITCHELL, a citizen of the United States, residing at Los Angeles, in the county of Los Angeles, State of California, have invented new and useful Improvements in Tripod Heads, of which the following is a specification.

This invention relates to a tripod head useful in connection with tripods for various uses and purposes, and among the objects of the invention is the provision of a simple, effective, durable and solid device of this character.

A tripod head as provided by this invention is applicable for use in connection with various types or constructions of tripods, and is adapted for various uses and purposes although it is particularly adapted for use on, or in connection with, a camera tripod, and more specifically, a motion picture camera tripod. For purpose of illustration and example the invention is herein specifically set forth in a form best applicable for use on a motion picture camera tripod it being understood, however, that such disclosure is not intended to act in any way as a limitation of the scope of the invention.

A particular and noteworthy feature of the invention is the provision of a tripod head with a rotating head part having a large and effective bearing surface or support at its periphery. By this construction a particularly solid and rigid device is provided. The provision of a solid and rigid device of this character is of particular note in that ordinary devices of this character are subject to being more or less unfirm and liable to jar.

Another feature of the invention is the provision of both quick and slow adjusting means in connection with the rotatable head member with a bearing at its periphery, or in other words, the invention incorporates the various adjustments, desirable in a device of this character with the durable and solid form of construction provided by the invention.

Other objects and features of the invention, not herein specifically set forth or referred to, will be understood from the following detailed description of a specific preferred form of the invention throughout which reference is had to the accompanying drawings in which—

Figure 1:
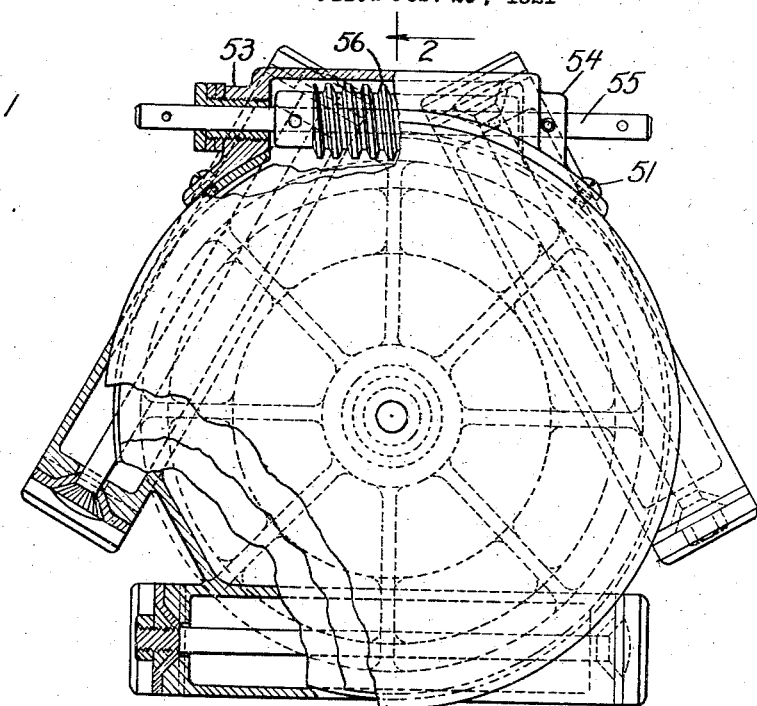
Figure 2:
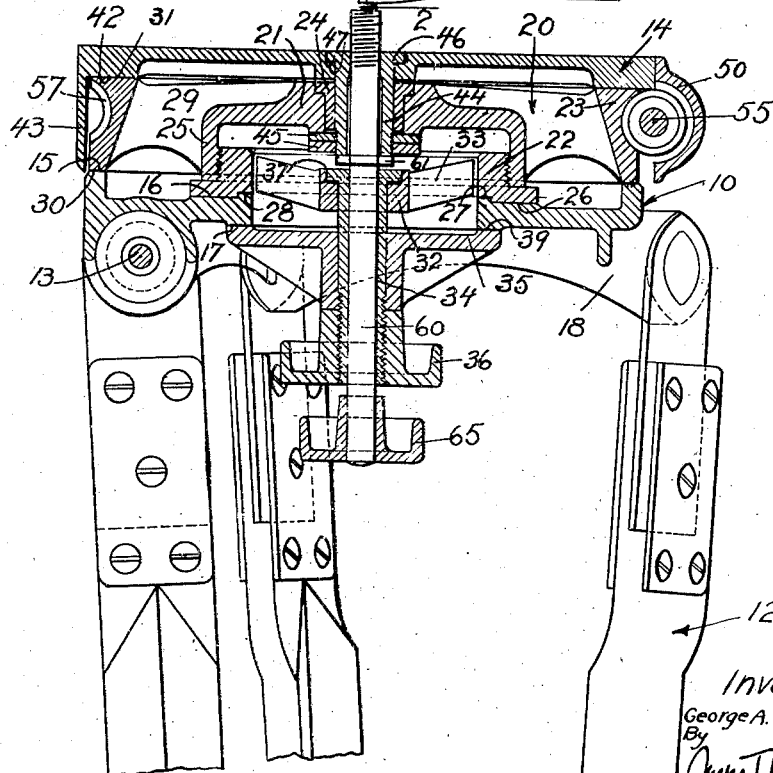

Fig. 1 is plan view of the tripod head with some parts broken away to show in section; and Fig. 2 is a detailed vertical sectional view of the head taken as indicated by line 2—2 on Fig. 1.

Throughout the drawings numeral 10 designates, generally, the frame of the device to which the legs 12 are attached, by suitable pins 13, and on which is carried the rotatable head 14. The frame 10 is an annular cast member formed at its outer periphery with an annular upwardly facing bearing surface 15, at its inner periphery with an annular upwardly facing bearing surface 16 and and an annular downwardly facing bearing surface 17. Suitable lugs or projections 18 are formed on the frame 10 to carry the pins 13 by which the legs 12 are connected to the frame.

Between the frame 10 and the rotatable head 14, or on the frame 10 and within the rotatable head 14, is arranged a carrier 20, which supports the rotatable head 14. The carrier 20 comprises a hub portion 21, a bearing member 22, and a gear or ring member 23. The hub portion 21 is fitted with a bushing 24 and is formed with an internally screw-threaded drum portion 25 into which the bearing member 22 is adapted to tightly screw thread. The bearing member 22 is formed with a downwardly facing bearing surface 26 which engages and cooperates with the upwardly facing bearing surface 16 of the frame 10. In practice it is preferred that a projection 27 be formed on the surface 16 to extend into a recess 28 formed in the surface 26 to hold the frame 10 and bearing member 22 concentrically. The ring portion 23, of the carrier 20, is supported from the hub 21 by radially disposed spokes or ribs 29, is formed at its periphery with a downwardly facing bearing surface 30 and an upwardly facing bearing surface 31. The bearing surface 30 registers with and engages the bearing surface 15 of frame 10 and thereby causes the carrier 20 to be supported at its periphery, or extreme outer portion, as well as at its hub, or inner portion, by bearing member 22. In practice the bearing member 22 being screw threaded into the drum portion 25 is adjustable to cause the bearing surfaces 26 and 16 and the bearing surfaces 30 and 15 to all accurately engage and cooperate. In other words, the bearing member 22 being separate from the rest of the carrier 20 permits of adjusting the bearing surfaces so that the carrier is properly and accurately supported both at its inner and its outer parts. From the foregoing description it will be readily understood how the carrier 20, with the rotatable head 14, may be freely turned or rotated relative to the frame 10, and how it is held concentric with the frame 10 at all times by the co-operation of projection 27 and recess 28.

As means for setting the carrier and for positively preventing it from rotating relative to the frame 10, a hub 32 is supported concentrically in the bearing member 22, by spokes or ribs 33, to carry a sleeve 34 which extends downwardly through the frame 10 and carries at its lower end a washer or clamp member 35 and a lock nut 36. The sleeve 34 is formed at its upper end with a flange 37 by which it is anchored or secured at its upper end to the hub 32, and the clamp member 35 is formed with an upwardly facing surface 39 adapted to engage the downwardly facing surface 17 of the frame 10. The lock nut 36 which is preferably a knurled nut adapted to be easily gripped and operated by hand, is screw-threaded on the sleeve 34 so that it can be operated to engage, or bear against, the clamp member 35. With this construction it will be readily understood how the lock nut 36 may be tightened on the sleeve 34 to cause the entire carrier 20 to be drawn, or firmly clamped, to the frame 10. It will be understood from inspection of the drawings how this clamping action will not cause deformation of any parts of the device and will not cause excessive strains to be set up in any parts of the device. This is because the strains of the clamping action are in the clamp member 35, bearing member 22, and in that portion of the frame 10 at which the surfaces 16 and 17 are formed. In operation the mechanism just described permits of the carrier 20, and therefore the head 14, being quickly and effectively set or locked against rotation simply by proper rotation of the lock nut 36. Further, when the carrier 20 is in its set or locked condition it may be easily and quickly released to be freely rotatable by merely rotating the lock nut 36 to loosen it on the sleeve 34.

The rotatable head 14 is a flat disk-like member formed at its periphery with a downwardly facing bearing surface 42 adapted to engage and co-operate with the bearing surface 31 of carrier 20. A flange 43 is formed at the periphery of the head 14 to extend downwardly over and cover the carrier 20 in the manner clearly shown in Fig. 2 of the drawings. A sleeve 44 is carried by the head 14 to extend downwardly through bushing 24 and carry nuts 45 on its lower end portion. The sleeve 44 is held in the head 14 by a flange 46 formed at its upper end to fit in a recess 47 formed in the head 14. In practice the nuts 45 are adjusted on the sleeve 44 so that they clamp more or less tightly against the hub portion 21 of carrier 20 and thereby cause the head 14 to be frictionally held against rotation relative to the carrier 20. The fact that the nuts 45 can be easily adjusted to take up wear or looseness is important in that it permits of the device being kept in proper and accurate working order.

At one side of the head 14 the flange 43 is broken away and a casing 50 is mounted on the flange 43, by means of suitable screws 51, to extend over and cover said broken away portion of the flange. The casing 50 is formed at its ends with bearings 53 and 54 in which are carried a shaft 55. The arrangement of the casing 50 and bearings 53 and 54 is such that the shaft extends through the casing at the broken away portion of flange 53 and projects or extends from each end of the casing, as clearly shown in Fig. 1. A worm gear 56 is mounted on the shaft 55 within the casing 50 in a manner to engage and mesh with gear teeth 57 formed in, or at, the outer face or periphery of the carrier 20. Each end of the shaft 55 is adapted to receive a crank or operating handle by which the shaft may be rotated to cause relative movement between the carrier 20 and head 14 due to the cooperation of the worm gear 56 and teeth 57. In practice the nuts 45 are set on the sleeve 34 only sufficiently tight to hold the head 14 against undesirable or accidental movement relative to the carrier 20 and is not sufficiently tight to prevent the head 14 from being moved relative to the carrier 20 by the operating means just described. It will be readily understood how the mechanism just described provides means for slowly rotating, or accurately adjusting, the head 14 relative to the carrier 20 and frame 10 in addition to the means hereinbefore set forth for quickly adjusting or rotating it relative to the frame 10. This arrangement and combination is important in that it provides a tripod head with particularly strong and rigid construction and also convenient and desirable adjustments.

As means for attaching a camera, or the like, to the head 14, a rod 60 is arranged in the sleeves 34 and 44 to have a screw-threaded end portion extending above the head 14 in the manner clearly shown in Fig. 2. The rod 60 is formed with a collar 61 to engage the lower end of sleeve 44 and is of such length as to extend from the lower end of the sleeve 34 and carry a suitable knob 65 by which it may be operated. The rod 60 is rotatably carried in the sleeves 34 and 44, and is adapted to be rotated to cause it to screw-thread into a suitable bore in the camera until the camera is securely and firmly held and clamped against the head 14. The mounting of a camera on the head 14 by means of the rod 60 does not interfere in any way with the operation of the head as the rod 60 when tightly screwed into a camera merely causes the camera to be drawn against the upper face of the head 14 and the upper end of sleeve 44, and causes the collar 61 to clamp or bear against the lower end of the sleeve 44.

In practice when it becomes necessary or desirable to remove parts of the device so that inner, or enclosed parts are accessible the bearing member 22 is tightened against the frame and the head 14 and other parts of the carrier are rotated to cause detachment of the bearing member 22 and the drum portion 25. It will be readily understood how this allows the head and all of the carrier except the bearing member 22 to be removed from the frame. Such removal of the head, etc., may be necessary when it is desired to adjust the nut 45.

From the foregoing description it will be understood how the load or weight of a camera, or like device, mounted on the tripod head, is supported at the central part of the head and at the periphery of the head 14, and is transmitted from the periphery of the head 14 to the periphery of the frame 10 through ring portion 23 of the carrier 20. In other words, the load supported by the tripod head is supported in part at and by the periphery portion of the structure and not wholly by and at the central, or pivot, portion of it. It will be understood how this feature of the invention renders the device particularly solid and durable. The solidness and durability of the device are due largely to the provision of a comparatively large long bearing surface at the outer portion together with a comparatively large bearing surface at the central portion.

Having set forth a preferred embodiment of my invention I do not wish to restrict myself to the particular details hereinabove set forth but wish to reserve to myself any changes or variations that may appear to those skilled in the art or that may fall within the scope of the following claims:

Having described a preferred form of my invention, I claim:

1. In a tripod head, a frame having an upwardly facing bearing surface near its center and an upwardly facing bearing surface near its periphery, and a member rotatably mounted on the frame and including two parts vertically adjustable relative to each other, one of said parts having a downwardly facing bearing surface adapted to bear on the bearing surface near the center of the frame and the other of said parts having a downwardly facing bearing surface adapted to bear on the bearing surface near the periphery of the frame.

2. In a tripod head, a frame having an upwardly facing bearing surface near its center and an upwardly facing bearing surface near its periphery, and a member rotatably mounted on the frame and including two parts having a screw thread connection so that they are vertically adjustable relative to each other, one of said parts having a downwardly facing bearing surface adapted to rest on the bearing surface near the center of the frame and the other of said parts having a downwardly facing bearing surface adapted to rest on the bearing surface near the periphery of the frame.

3. In a tripod head, a frame having an upwardly facing bearing surface near its center and an upwardly facing bearing surface near its periphery, a member rotatably mounted on the frame and including two parts having a screw thread connection so that they are vertically adjustable relative to each other, one of said parts having a downwardly facing bearing surface adapted to bear on the bearing surface near the center of the frame and the other of said parts having a downwardly facing bearing surface adapted to bear on the bearing surface near the periphery of the frame, and means for releasably clamping one of said parts to the frame.

4. In a tripod head, a frame having an upwardly facing bearing surface near its center and an upwardly facing bearing surface near its periphery, a member rotatably mounted on the frame and including two parts vertically adjustable relative to each other, one of said parts having a downwardly facing bearing surface adapted to bear on the bearing surface near the center of the frame and the other of said parts having a downwardly facing bearing surface adapted to bear on the bearing surface near the periphery of the frame, and a head rotatably mounted on said member with a support at its periphery.

5. In a tripod head, a frame having two upwardly facing bearing surfaces, one near its center and the other near its periphery, a member rotatably mounted on the frame and including two parts adjustable vertically relative to each other, one of said parts having a downwardly facing bearing surface adapted to ride on the central bearing of the frame and the other having a downwardly facing bearing surface adapted to ride on the peripheral bearing of the frame, and means to clamp said member down to the frame at its center.

6. In a tripod head, a frame, an upwardly facing bearing surface at the periphery of the frame, a carrier rotatable on the frame and having a lower bearing surface at its periphery adapted to ride on the peripheral bearing surface of the frame, a head rotatable on the carrier, said carrier having an upwardly facing bearing surface at its periphery and the head having a lower bearing surface at its periphery adapted to ride on the last mentioned bearing surface of the carrier; said frame also having an upwardly facing bearing surface near its center, an adjustable bearing member at the lower part of the carrier, adjustable vertically with relation to the carrier, and having a downwardly facing bearing surface adapted to ride on the central bearing surface of the frame; means acting directly on the carrier at its center to clamp the carrier down on the frame, separate means holding the head down on the carrier, and means normally to hold the head against rotation on the carrier, and operable to rotate the head relative to the carrier.

7. In a tripod head, a frame, an upwardly facing bearing surface at the periphery of the frame, a carrier rotatable on the frame and having a lower bearing surface at its periphery adapted to ride on the peripheral bearing surface of the frame, a head rotatable on the carrier, said carrier having an upwardly facing bearing surface at its periphery and the head having a lower bearing surface at its periphery adapted to ride on the last mentioned bearing surface of the carrier; said frame also having an upwardly facing bearing surface near its center, an annular bearing member screw-threaded up into the lower part of the carrier and vertically adjustable with relation thereto, said member having on its lower face a bearing surface adapted to ride on the central bearing surface of the frame, and means acting directly on said bearing member to clamp it to the frame.

8. In a tripod head, an upwardly facing frame having a bearing surface near its center and an upwardly facing bearing surface near its periphery, and a member rotatably mounted on the frame and including two parts vertically adjustable relatively to each other, one of said parts having a downwardly facing bearing surface adapted to ride on the central bearing surface of the frame and the other of said parts having a downwardly facing bearing surface adapted to ride on the peripheral bearing surface of the frame, and means acting directly on the first mentioned one of said parts to clamp it to the frame.

9. In a tripod head, a frame, an upwardly facing bearing surface in the periphery of the frame, a carrier rotatable on the frame and having a lower bearing surface at its periphery adapted to ride on the peripheral bearing surface of the frame, a head rotatable on the carrier, said carrier having an upwardly facing bearing surface at its periphery and the head having a lower bearing surface at its periphery adapted to ride on the last mentioned bearing surface of the carrier, said frame also having an upwardly facing bearing surface near its center, an annular bearing member screw-threaded up into the lower part of the carrier and vertically adjustable with relation thereto, said member having on its lower face a bearing surface adapted to ride on the central bearing surface of the frame, and means acting directly on said bearing member to clamp it to the frame, said means acting centrally on said bearing member; the carrier having a central hub part over said bearing member, a sleeve having a shoulder at its upper end bearing down on the head, said sleeve projecting down through the central hub part of the carrier, a nut on the lower end of the sleeve below said hub part to hold said sleeve and the head down on the carrier, and screw means connecting the head and carrier normally to prevent relative rotation between them and operable positively to cause relative rotation between them.

In witness that I claim the foregoing I have hereunto subscribed my name this 30th day of August 1920.

GEORGE A. MITCHELL.

Witness:
  VIRGINIA BERINGER.